E. BAUSCH, H. BAUSCH, G. HOMMEL, W. L. PATTERSON & E. SAILER.
PROJECTION APPARATUS.
APPLICATION FILED OCT. 3, 1906.

1,059,969. Patented Apr. 29, 1913.

UNITED STATES PATENT OFFICE.

EDWARD BAUSCH, HENRY BAUSCH, GEORGE HOMMEL, WILLIAM L. PATTERSON, AND ERNST SAILER, OF ROCHESTER, NEW YORK, ASSIGNORS, BY MESNE ASSIGNMENTS, TO BAUSCH & LOMB OPTICAL COMPANY, (NO. 2,) OF ROCHESTER, NEW YORK, A CORPORATION OF NEW YORK.

PROJECTION APPARATUS.

1,059,969.  Specification of Letters Patent.  Patented Apr. 29, 1913.

Application filed October 3, 1906. Serial No. 337,169.

*To all whom it may concern:*

Be it known that we, EDWARD BAUSCH, HENRY BAUSCH, GEORGE HOMMEL, WILLIAM L. PATTERSON, and ERNST SAILER, all of Rochester, in the county of Monroe and State of New York, have invented certain new and useful Improvements in Projection Apparatus; and we do hereby declare the following to be a full, clear, and exact description of the same, reference being had to the accompanying drawings, forming a part of the specification, and to the reference-numerals marked thereon.

Our present invention relates to improvements in apparatus adapted for use in projecting enlarged images of various objects or view slides onto a suitable screen, for use in connection with lectures or other illustrative purposes, and the object of the invention is to provide such an instrument of such a construction as will possess ample rigidity to assure the maintenance of the proper optical relations of the different optical elements, and to provide an improved instrument having its parts so constructed that the different elements may be interchanged one with the other in order that an instrument may be converted into various forms in order to adapt the apparatus for universal application to the different methods of projecting images of objects having widely different characteristics, as well as to enable two or more of the instruments to be built up in units to permit simultaneous projection from both instruments or lanterns such as is desirable in color work, or to permit the lanterns to project their images on the screen in such a way that one view gradually dissolves or blends into the next succeeding image.

To these and other ends the invention consists in certain improvements and combinations of parts, all as will be hereinafter more fully explained, the novel features being pointed out in the claims at the end of the specification.

In the drawings.

Similar reference numerals in the several figures indicate similar parts.

As previously stated, the general object of the present invention is to provide an improved projection apparatus having its parts or elements so interchangeable as to enable the apparatus to be converted into different forms adapted to the different methods of projection, and to improve the general construction and efficiency of the apparatus as a whole, so that the best results may be obtained, and the parts handled with facility.

The present embodiment of our invention, as shown in the accompanying drawings, comprises generally the base 1 having laterally-extending feet 2 adapted to provide a firm seating of the apparatus upon a table or other suitable support, this base, in the present instance, serving as an optical bench for supporting the elements of the lower lantern, and it preferably embodies a rigid bar or member of a form similar to a lathe bed; that is to say, it has vertically-tapered sides adapted to coöperate with the correspondingly-formed pedestals of the several elements of the lantern, a longitudinally-extending T-slot being provided to receive the head of the clamping bolts on the several lantern elements.

The lanterns in the embodiment shown employ arc lamps as a source of illumination, although it will be understood that the invention is not limited to any particular type of illuminating device, and the lamp of each lantern is inclosed in a suitable hood 3, the latter being open at the rear to admit the lamp and having a front plate 4 preferably formed of a casting provided with a forward extension 5 milled or otherwise formed to fit the bed 1 as a pedestal, a clamping bolt or screw 6 having a head serving to coöperate with the T-slot in the bed for detachably holding the hood in the proper adjusted position in a direction longitudinally of the bed. This front plate is also provided with a pair of laterally extending arms 7, having rails 8 extending rearwardly therefrom and arranged at each side of the lamp hood, and these rails serve as sliding supports for the lamp, the latter comprising, in the present instance, a base 9, having ways 10 at each side thereof adapted to rest on and coöperate with the rails 8 of the lamp hood, these ways serving to support the lamp within the hood and to permit a relatively rough adjustment of its position in a direction of the optical axis of the lantern for focusing and similar purposes, clamping screws 11 being provided for holding the lamp in the desired or adjusted position.

The base of the lamp is provided with a longitudinally-extending, dove-tail groove 12 adapted to receive a correspondingly formed slide 13, a screw 14 being interposed between the slide with the lamp base and serving as a fine or finishing adjustment for the lamp in the direction of the optical axis of the lantern, after the lamp has been roughly adjusted by the movement of the latter on the supporting rails 8. This slide carries the standard 15, the latter being pivoted on the slide in order that it may be turned in a horizontal plane, a lug 16 projecting radially from the standard or post and coöperating with the end of a screw 17 threaded in the slide and serving to adjust the standard about its vertical axis, and this adjustment serves to adjust the source of light in a direction laterally of the optical axis. In the upper end of this standard is pivotally mounted the carbon support 18, the latter being pivoted to swing in a vertical plane intersecting the optical axis of the lantern, a screw 19 threaded in the slide and coöperating with an arm 20 on the carbon support and serving to effect the adjustment of the carbons in a vertical plane. The vertical adjustment thus provided, combined with the horizontal swinging adjustment between the standard and the lamp-supporting slide, provide universal adjustment that will enable the carbons to be accurately positioned relatively to the optical center of the lantern.

The carbons, in the present form of the lamp, are arranged at right angles, one of them, the upper carbon, being arranged horizontally and substantially in alinement with the optical center of the lenses, while the other carbon is arranged at right angles thereto, the carbons being conveniently mounted on carriers 21 and 22, each having a part adapted to coöperate with the corresponding adjusting screws 24 and 25, the latter being provided with adjusting heads 26 and 27 arranged at the rear of the lamp and conveniently accessible for manipulation in properly positioning the carbons in relation to each other.

The lamp hood 3 is preferably constructed of sheet metal, the sides being composed of sheets of corrugated metal, screwed or otherwise secured to the flanges of the front and rear plates of the hood. The top of the hood forms a passage for the heated air rising from the lamp, and in order to prevent the passage of light from the lamp hood, that would impair the definition of the image on the screen, a series of angular plates 30 is fitted across the top of the hood at each side of an intermediate V-shaped plate 30ᵃ, these plates being bent in the vertical plane to form a tortuous passage between the interior and exterior of the hood, so that while the passage of light would be prevented, the heated air and gases in the interior of the hood arising from the illuminating device, find passages of escape between these plates.

According to the present invention, it is preferable that the lamp and its parts and the condenser system be mounted and arranged as a complete illuminating unit, and this is accomplished in the present instance by providing a pair of rails 32 which are secured at their rear ends in the front plate 4 of the lamp hood and are suitably spaced to form supports for the front and rear lens elements 33 and 34, and the intermediate water tank or cooling cell 35, the arrangement of these rails serving to automatically center the elements of the condensing system in alinement with the optical axis of the lens, and as the illuminant or lamp may be readily detached from the bed by loosening the clamping bolt 6, the arrangement of the lamp and condensing system as a complete unit enables this part of the apparatus to be conveniently attached to or employed as a part of another lantern, so that a single lamp may be interchanged between several lanterns without requiring a re-arrangement thereof.

The condensing system employed in the present embodiment of the invention is of a novel design to withstand the heat from the source of illumination, the front and rear lens elements 33 and 34 being separated by the cooling cell 35, and as the light rays in passing from the rear lens element 34 to the front lens element 33, are parallel or substantially so, the maximum area of the cooling medium will be presented to the light rays so that the heat will, in a large measure, be dissipated, and this is particularly efficient in cases where living organisms are being used as specimens, and which would otherwise be killed or destroyed by the high temperature.

In the front of the condensing system is arranged the usual extensible bellows 55, which, in the present form of the invention, is detachably supported between a pair of standards 56 and 57, each standard being composed of a casting having a frame formed at its upper portion of a size and shape corresponding with that of the bellows. At their lower edges the frames of the standards 56 and 57 are provided with pairs of forwardly-extending lugs 58 having the upwardly-extending dowel pins or projections 59 thereon adapted to enter the correspondingly-arranged apertures 60 formed in the lower edge of the frame 61 which is secured to one end of the bellows, the opposite end of the bellows being provided with a similar frame 62, adapted to be detachably secured to the frame of the standard 56, the bellows being attached to and detached from the respective standards by a relative vertical tilting movement about these pins or projections as centers. The upper edges of the frames of the bellows are secured preferably by spring catches which automatically operate to retain the frames for the bellows in fastened position and which may be readily manipulated to release the bellows so that the latter may be readily interchanged from one part of the apparatus to another, a catch of this kind being employed in the present instance on each of the standards, the catch on the rear standard 57 being composed of the housing 64 suitably secured to the top of the standard frame, a latch 65 being pivoted to tilt on the shaft 66 passing horizontally through the housing and being operated with a yielding pressure in one direction by a helical spring 67 which preferably surrounds the shaft in the housing. The frame attached to the bellows is provided with a suitable projection 70 which is adapted to enter an aperture in the latch whenever the frame on the bellows is tilted toward the standard frame, and whenever it is desirable to detach the bellows, it is merely necessary to lift the latch by the finger sufficiently to release the coöperating projection.

Figures 1, 11:
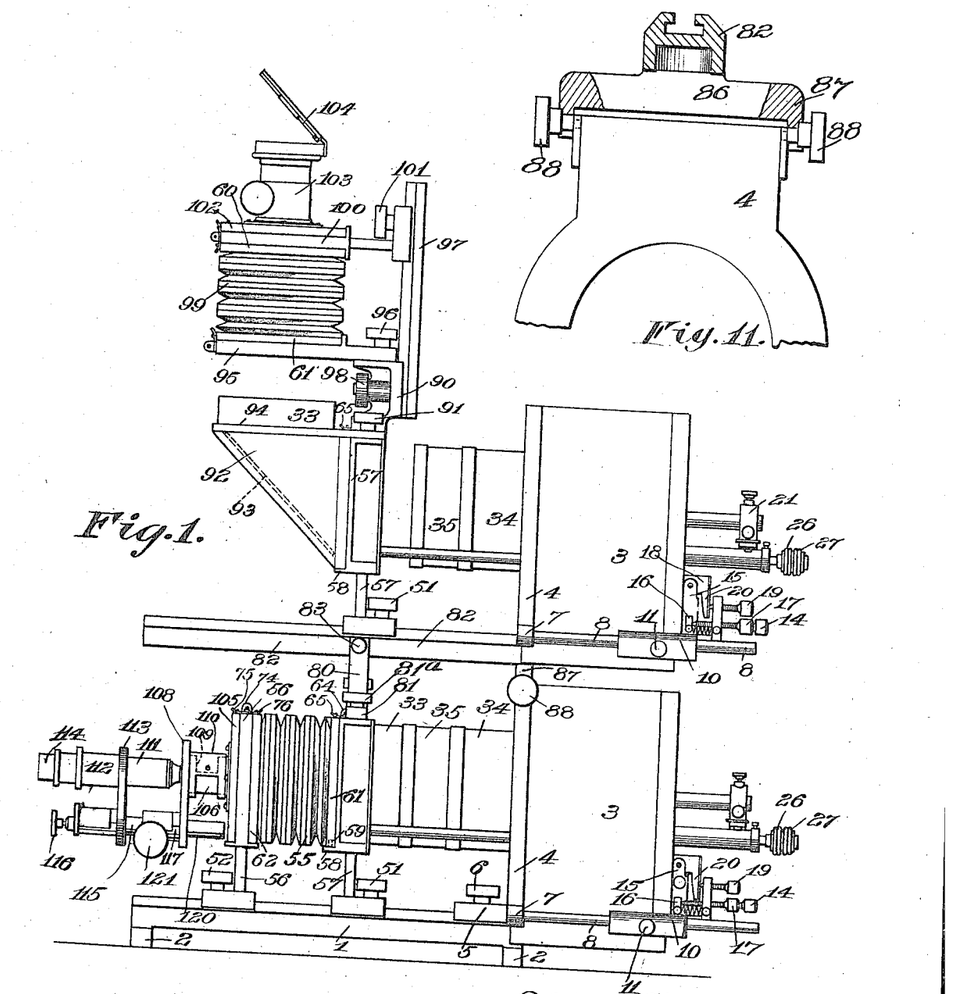
Figure 1 represents a side elevation of a projection apparatus constructed in accordance with our invention, the upper lantern being arranged for vertical projection and the lower lantern for microscopic projection.
Fig. 11 represents a section showing the coöperating devices for positioning and supporting a superposed lantern.
Figure 2:
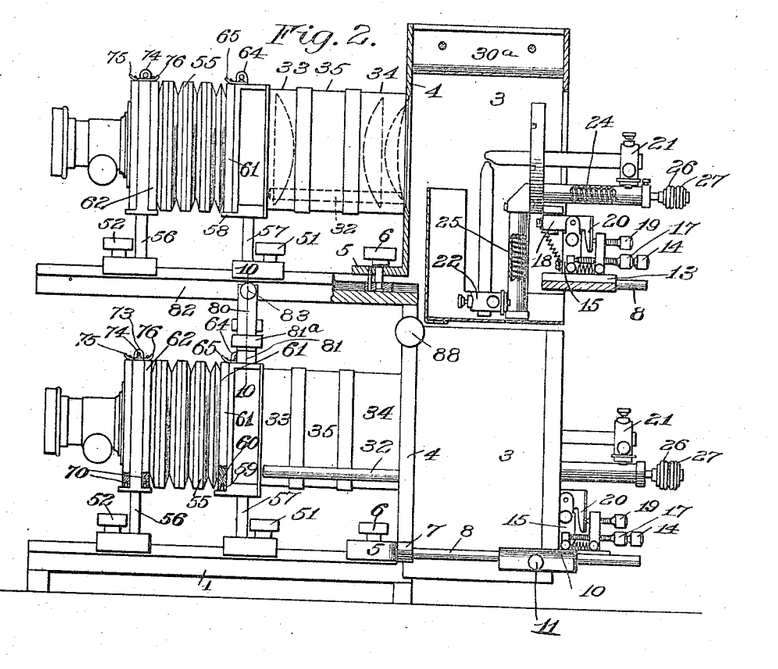
Fig. 2 is a side elevation of the apparatus with the lanterns adapted for simultaneous, successive, or alternate projection, the lamp of the upper lantern being shown in vertical section.
Figure 3:
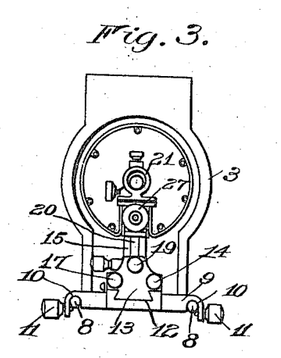
Fig. 3 is a rear view of one of the arc lamps shown in Figs. 1 and 2.
Figure 4:
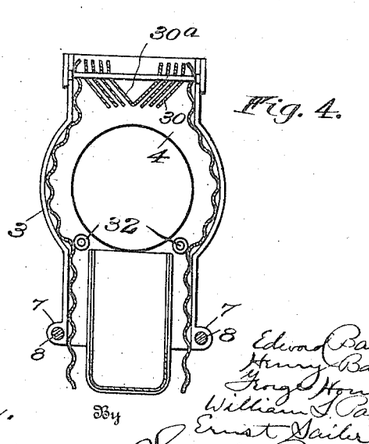
Fig. 4 represents a vertical transverse section of the lamp hood, the lamp elements being shown removed.
Figures 5, 6, 6A, 8, 9:
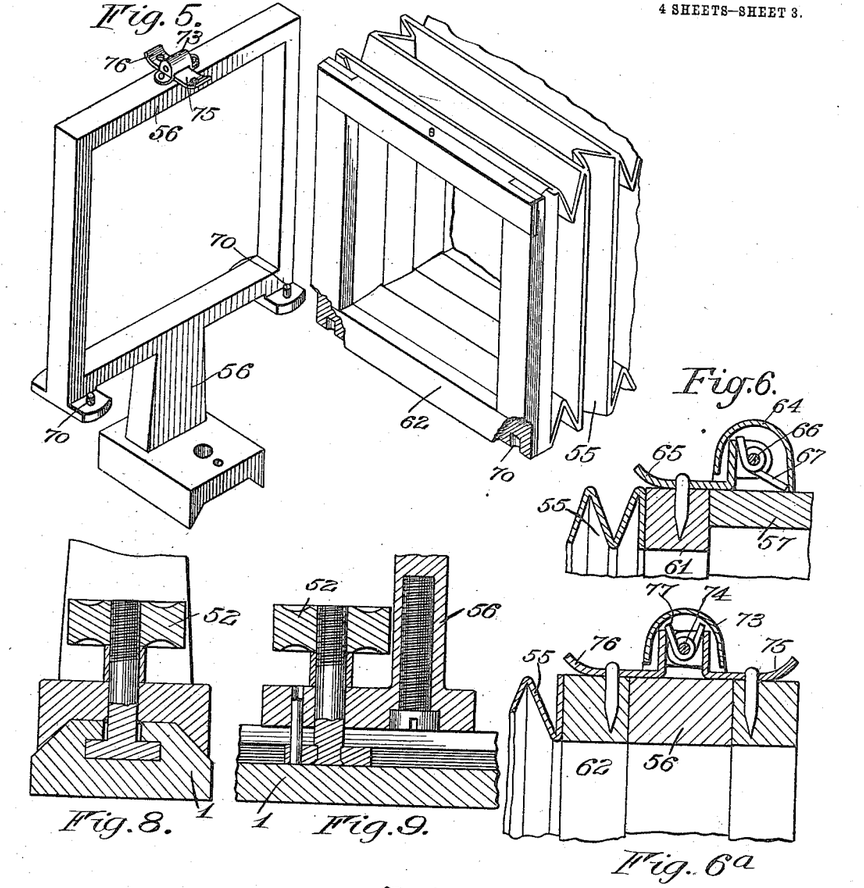
Fig. 5 is a perspective view of one of the bellows-supporting slides removed from the optical bench, the bellows being shown in angular relation with the slide or standard to indicate the relative arrangement of the detachable catch arrangement between them.
Figs. 6 and 6ª represent sections through the single and the double catch devices and the tops of their respective slides and coöperating parts.
Figs. 8 and 9 represent transverse and longitudinal sections, respectively, of portions of the optical bench, and one of the slides or standards, showing the clamping device.
Figure 7:
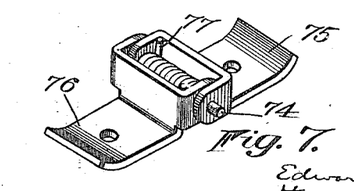
Fig. 7 is a perspective view of the catch with its housing removed.
Figures 10, 12, 13:
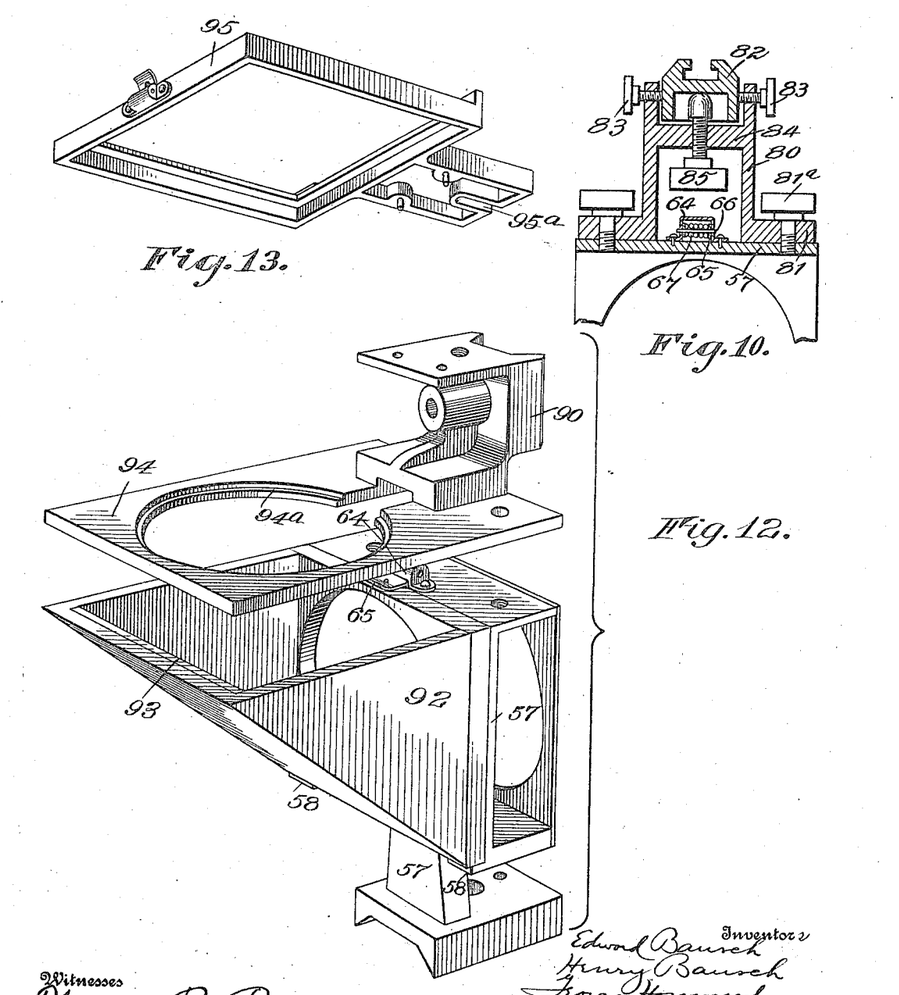
Fig. 10 represents a transverse section on the line 10—10 of Fig. 2.
Fig. 12 is a perspective view of the supporting devices for the vertical attachment and the stage and reflector.
Fig. 13 shows the lower support for the bellows for the vertical attachment.

The forward standard 56 has a pair of dowel pins or projections 70 adapted to coöperate with correspondingly-arranged apertures or recesses in the front board which carries the projecting element such as the usual projecting lens, or a microscope, as shown in Fig. 1, and in this case it is preferable to employ a double catch, that is to say, one which will serve to fasten the front board as well as the bellows, such a catch embodying a housing 73 having a pin or shaft 74 extending therethrough and serving as a pivotal support for a pair of latches 75 and 76, the latter extending in opposite directions, and being connected to the opposite ends of a helical spring 77 which preferably encircles the shaft, a single spring thus serving to operate both latches. Each of the standards 56 and 57 has a pedestal formed to coöperate with the bed 1 so that the relative longitudinal position of these standards on the bed may be adjusted, clamping bolts or screws 51 and 52 being employed for retaining these standards in relative adjusted positions on the optical bench.

The lantern thus described is of a type adapted for horizontal projection, and is adapted for single projection, but it is frequently necessary or desirable to employ a set of lanterns so arranged that the images may be either simultaneously or successively cast upon the screen by the different lanterns, such, for instance, as in color projection, or for apparatus as used in connection with illustrated lectures, wherein one picture gradually dissolves and is blended into the next succeeding picture, and in order to enable the lantern hereinbefore described to be employed in connection with this class of projection, it is so constructed that one or more lanterns may be superposed thereon.

In the present embodiment the lower lantern is adapted to support the lantern or lanterns arranged above it, one of the standards, preferably the standard 57, having a bracket 80 provided with branched feet 81 secured to the top of the frame of the standard by the screws 81ª, and this bracket has a pair of vertically-arranged spaced arms adapted to receive the bed 82 of the lantern next above it, clamping screws 83 serving to secure the bed from disengagement, these arms 81 of the bracket being connected by a horizontal cross piece 84 having an adjusting screw 85 passing vertically therethrough and arranged to bear on the under side of the bed 82 of the upper lantern to effect vertical adjustment of the latter, and toward the rear of the bed 82 of the upper lantern is secured a bracket 86 having down-turned arms 87 which are recessed to coöperate with suitable clamping screws 88 which project laterally from opposite sides of the front plate 4 of the lower lantern, these clamping screws serving as pivots for the upper lantern when the latter is adjusted in a vertical plane by manipulation of the screw 85 in order to bring the images projected onto the screen by the different lanterns into co-incidence, and by tightening the screws 83 and 88 the upper lantern will be firmly held from displacement. Of course in employing two or more lanterns built up in the way described for successively projecting a series of pictures on a screen, the lantern elements will be duplicates in arrangement.

Sometimes it is necessary, or desirable, to illustrate by aid of a screen, different experiments of physics or chemistry, wherein it is necessary to support the object, or substance under examination, in a horizontal position, and the apparatus is shown adapted for such a use in Fig. 1 of the drawings. In this arrangement of the apparatus, a bracket 90 is secured to the top of the standard 57 in place of the bracket 80 by means of the clamping or securing screws 91, and to the front of this standard is detachably fitted by means of the dowel and catch connection similar to that for the bellows, a box 92 having a mirror 93 therein so arranged as to divert the horizontal beam of light from the lamp into a vertical path, and the bracket 90 has a stage 94 secured thereto and fitting over the top of the mirror box and provided with a seat 94ᵃ to receive the forward lens element 33 of the condensing system, which is preferably transposed to a position beyond the mirror or reflector when the apparatus is being used with a vertical attachment, the reflector being thus arranged to receive the parallel rays of light. This bracket 90 has a lower bellows support 95 fixed thereto by means of the clamping screw 96 passing through a slot 95ᵃ in the support, and the bracket in turn is slidingly fitted to a vertically-extending bench 97, the latter being similar in cross section to the horizontal bench of the lantern as previously described, and this bench is secured to the bracket by a clamping screw 98 carried by the bracket. The vertical bellows 99 is a duplicate of that employed for horizontal projection, except that it is interchanged and fitted in vertical position between the upper and lower bellows supports 60 and 61, the upper end of the bellows being secured to a standard or support 100, which is adjustably secured to the bench 97 by means of the clamping screw 101, and is a duplicate of the standard 56, the front board 102 carrying the projection lens 103 being attached to this upper support by means of a double catch of the construction hereinbefore described, the projection lens and its front board being interchangeable with the microscope and its front board, so that either may be employed as desired. The vertical beam of light passing through the bellows and projection lens after leaving the mirror, is returned to a horizontal path and cast upon the screen by means of a mirror or other reflector 104, arranged at a suitable angle above the projection lens.

In casting highly magnified images of microscopic objects upon the screen, the microscope and its front board 105 are secured in position by the fastening devices on the forward standard 56 in front of the bellows, the optical center of the microscope being arranged in alinement with the beam of light passing through the bellows, and in order to obtain the best results for projection purposes, it is preferable to employ a microscope of a special type which will afford an extra long adjustment so that extremely low power objectives, as well as those of comparatively high power may be employed without the necessity of substituting a different microscope, and the sub-stage of the microscope is so constructed that a suitable condensing lens may be conveniently inserted in the exterior of the apparatus to bring the light rays into proper form relatively to the objective. The microscope is secured to the front board by means of the sub-stage tube 106, the latter being provided with a segmental slot or opening 109 adapted to admit a suitable lens for properly focusing the light rays from the condensing system relatively to the objective, a rotatable sleeve 110 being employed as a cover for closing the opening in the sub-stage. The microscope objective is adapted to be attached to a draw tube 111 which is arranged to slide in a direction toward and from the stage of the microscope through a guide tube 112 secured to the lens carrier 113, the draw tube 114 for the eye piece being fitted to slide into and out of the draw tube of the objective. The lens carrier 113 is connected to the stage and base of the microscope by means of a pillar 115, the latter having a sliding connection with the lens carrier, and provided with a fine adjustment screw 116 for effecting relative adjustment between the pillar and the lens tube carrier. The bearing 117 is secured to the top of the stage to slidingly receive the pillar 115, and that portion of the pillar extending therethrough is provided with a rack bar 120 which is arranged to coöperate with a pinion carried by the adjusting head 121, manipulation of the latter serving to roughly adjust the position of the lens system of the microscope relatively to the stage thereof, and the rough adjustment thus afforded by the pillar and its adjusting head, together with the adjustment provided by the draw tube, afford an unusual range of adjustment of the objective relatively to the stage, and this enables the same microscope to be employed for microscopic projection when both high and low power objectives are employed.

Projection apparatus constructed on the interchangeable plan as contemplated by our invention enables the elements of the lanterns to be so interchanged as to convert the apparatus into different forms according to the characteristics of the objects to be projected and to the methods of projection desired to be employed, the improved devices for assembling the elements enabling the same lantern to be arranged for either horizontal or vertical projection; while the novel devices provided enable one or more lanterns to be superposed on a lower or supporting lantern with sufficient firmness as will insure maintenance of the proper optical relations thereof, and the novel method of combining the lamp or illuminator enables the latter to be readily attached to or detached from the ways or optical bench of the lantern, the detachable arrangement enabling a lamp to be removed from one lantern and mounted in proper optical relation with the elements of another lantern as may be desired. Moreover, the novel means for supporting the lamp enable the latter to be adjusted to bring the luminous point in the proper position to secure the proper focus of the light rays relatively to the condensing system and the object, and as the condensing system is mounted on a part of the lamp hood, handling of the lamp is facilitated, and maintenance of the proper optical relations is insured.

We claim as our invention:

1. In projection apparatus, the combination with a base having suitable ways thereon and provided with a bolt-head receiving slot extending longitudinally of the base between the ways, of a support for a projection lens and a support for a slide, each having a pedestal fitting the ways on the base and provided with a clamping bolt having a head fitting the slot in the base.

2. In a projection apparatus, the combination with a suitable base and projection elements supported thereon, of an illuminator also supported on the base, embodying a hood, an electric arc lamp arranged therein, a rough adjusting device for moving both arcing elements of the lamp longitudinally of the optical axis of the apparatus and within the hood, and a fine adjusting device for moving both arcing elements across the lamp longitudinally of the optical axis and within the hood.

3. In projection apparatus, the combination with a suitable base and projection elements supported on the base, of an illuminator casing supported on said base and having supporting rails extending substantially in the direction of the optical axis of the apparatus, and a lamp embodying a base having ways thereon adapted to coöperate with the said rails for supporting the lamp, devices for securing the said lamp base in relative adjusted position on said rails, a device for moving the lamp in a horizontal plane on the base, and a device for moving the lamp vertically on the base.

4. In projection apparatus, the combination with a bed having suitable projecting devices arranged thereon, and provided with longitudinal ways, of an illuminator arranged in coöperative relation with the projection devices and embodying a hood or casing depending in rear of the bed and made up of a casting forming a front plate for the hood and having a forwardly-extending lug thereon formed to fit the ways of the bed, side plates secured to the front plate, lamp supporting rails secured directly to the front plate, and a lamp adapted to fit within said hood and operating on said rails.

5. In projection apparatus, the combination with a lantern embodying a base, a lamp inclosing hood having laterally-extending pivot screws thereon, a slide receiving standard, and a projection lens, of a second superposed lantern embodying a bed having a bracket thereon provided with bearings arranged to coöperate with the said pivot screws to permit relative pivotal movement of the lantern in a vertical plane, and a bracket supported on the said slide receiving standard having an adjusting screw coöperating with the bed of the superposed lantern for adjusting the latter vertically, guiding arms on said bracket and coöperating with said bed, and clamping screws coöperating with the bed for securing the latter in adjusted position.

6. In projection apparatus, the combination with a suitable bed, an illuminator mounted thereon, and a supporting standard arranged on the bed in alinement with the illuminator, of a microscope supported on said standard and embodying a stage, and the lens elements arranged in coöperative relation therewith, and a substage comprising a tube arranged in axial alinement with the apparatus and having an opening to admit the condensing lenses, and a closure for said tube.

7. In projection apparatus, the combination with a suitable bed, an illuminator, and a standard arranged on the bed in alinement with the illuminator, of a front board adapted to fit the standard, a microscope having a substage attached at its rear end to the front board and embodying a tube having an opening to provide a receptacle for substage condensers, and a sleeve rotatably fitted over said tube for controlling the opening of the latter.

8. In projection apparatus, the combination with a suitable bed, an illuminator, and a standard arranged on the bed in alinement with the illuminator, of a microscope supported on said standard embodying a stage, a lens carrier adjustable toward and from the stage, and a lens tube carrying the objective slidable in the lens carrier for affording an additional range of adjustment for the objective in the direction of the optical axis of the apparatus.

9. In projection apparatus, the combination with a suitable bed, an illuminator, and a standard arranged on the bed in alinement with the illuminator, of a microscope supported on said standard embodying a stage, a bearing formed on the stage and having an adjusting pinion journaled therein, a slide fitted in said bearing and having a rack thereon coöperating with the pinion of said bearing, a lens carrier, a bearing on the latter fitting said slide, an adjusting device arranged between the said carrier and slide, and a lens tube carrying the microscope objective guided on the lens carrier for movement of the objective in line with the optical center of the apparatus.

10. In projection apparatus, the combination with a horizontal bed, an illuminator, a condenser system, and a slide receiving standard arranged in front of the condenser system, of a box detachably connected to said standard in alinement with the condenser system and containing a mirror for deflecting the optical center of the apparatus to a vertical course, a stage arranged above the said box and mirror, a bracket secured to the top of said standard and serving to secure the stage thereto, a vertically-extending bed secured to the said bracket, bellows supports, one being directly secured to the bracket and the other being guided and supported on said vertical bed, and a projection lens arranged above the bellows.

11. An illuminator for projection apparatus comprising a casing adapted to contain a lamp and having an open rectangular top, a set of blades angularly shaped in vertical cross section extending from end to end in said top opening and disposed parallel to each other and spaced apart to form light excluding air circulating passages leading out of the casing.

12. An illuminator for projection apparatus comprising a casing adapted to contain a lamp and having an open top, a set of blades angularly shaped in vertical cross section, extending longitudinally in spaced relation to each other in said top opening and below the upper edges thereof, said plates at each side of the center of the opening being disposed angularly in opposite positions and tie rods extending transversely of the opening and plates and securing the latter in said opening.

13. In projection apparatus, the combination with a lantern comprising a base, a slide supporting standard thereon, a projection lens and illuminator arranged in coöperative relation therewith, of a second lantern arranged in superposed relation to the first lantern and embodying a bed rail having laterally extending feet at one end adapted to coöperate with the illuminator, a bracket coöperating with the other end of the rail and detachably mounted on the slide supporting standard and also having laterally extending feet, said feet of the rail and bracket being also adapted to coöperate with a plane surface to support said second lantern when removed from the first lantern.

14. In projection apparatus, the combination with a lantern embodying a suitable base, a slide supporting standard, a projection lens and illuminator arranged in coöperative relation therewith, of a second lantern located above the first mentioned lantern and provided with a centrally disposed bed rail having pivotal connection with the illuminator, a detachable bracket on the supporting standard of the lower lantern having vertically extending arms for guiding the vertical movement of the bed rail, and means on the bracket coöperating with the bed rail for adjusting the latter.

15. In projection apparatus, the combination with a lantern embodying a base, a lamp inclosing hood having laterally extending pivot screws thereon, a slide receiving standard, and a projection lens, of a second lantern adapted to be arranged in superposed relation to the first mentioned lantern embodying a bed rail having a bracket thereon provided with bearings arranged to coöperate with the said pivot screws to support one end of the bed and permit relative pivotal movement of the lantern, a bracket on the slide supporting standard of the lower lantern guiding the other end of said bed and means for adjusting the latter on the last mentioned bracket.

16. In projection apparatus, the combination with a lantern embodying a base, a slide supporting standard thereon, and a projection lens and illuminator arranged in coöperative relation therewith, of a second lantern located above the first-mentioned lantern and having a bed rail, a detachable bracket supported on the slide supporting standard of the lower lantern and having vertically extending arms embracing the rail and guiding it vertically, a centrally disposed screw on said bracket coöperating with said rail for adjusting the latter vertically, and screws carried by the said arms of the bracket and coöperating with the sides of the rail for securing the latter in adjusted position and also securing the bracket to the bed rail when said parts are removed from their normal position on the lower lantern.

EDWARD BAUSCH.
HENRY BAUSCH.
GEORGE HOMMEL.
WILLIAM L. PATTERSON.
ERNST SAILER.

Witnesses:
W. G. WOODWORTH,
JOSEPH HOMMEL.

Copies of this patent may be obtained for five cents each, by addressing the "Commissioner of Patents, Washington, D. C."